United States Patent [19]

Matsumoto et al.

[11] 4,410,595
[45] Oct. 18, 1983

[54] LAMINATE OF THERMOPLASTIC RESINOUS COMPOSITION

[75] Inventors: Koichi Matsumoto; Yoshihiko Katayama; Hisaya Sakurai, all of Kurashiki, Japan

[73] Assignee: Asahi Kasei Kogyo Kabushiki Kaisha, Osaka, Japan

[21] Appl. No.: 413,597

[22] Filed: Aug. 31, 1982

Related U.S. Application Data

[62] Division of Ser. No. 126,273, Mar. 3, 1980.

[30] Foreign Application Priority Data

| Mar. 8, 1979 | [JP] | Japan | 54/26136 |
| Mar. 27, 2979 | [JP] | Japan | 54/35070 |
| Apr. 13, 1979 | [JP] | Japan | 54/44272 |
| Jun. 29, 1979 | [JP] | Japan | 54/81446 |
| Jul. 4, 1979 | [JP] | Japan | 54/83896 |

[51] Int. Cl.$^3$ .............. B32B 27/36; B32B 27/38; B32B 27/40
[52] U.S. Cl. .............. 428/412; 428/413; 428/423.3; 428/423.5; 428/423.7; 428/423.9; 428/424.2; 428/424.4; 428/424.6; 428/424.7; 428/424.8; 428/425.1; 428/425.3; 428/425.6; 428/425.8; 428/425.9; 525/66
[58] Field of Search .............. 428/412, 413, 423.3, 428/423.5, 423.7, 423.9, 424.2, 424.4, 424.6, 424.7, 424.8, 425.1, 425.3, 425.6, 425.8, 425.9

[56] References Cited

U.S. PATENT DOCUMENTS

| 3,271,342 | 9/1966 | Kuhn et al. | 525/130 X |
| 3,649,439 | 3/1972 | Ross | 428/423.7 X |
| 4,223,099 | 9/1980 | von Harpe et al. | 525/66 X |
| 4,282,285 | 8/1981 | Mohiuddin | 428/424.6 X |
| 4,301,053 | 11/1981 | Wolfrey | 428/423.7 X |

Primary Examiner—P. Ives
Attorney, Agent, or Firm—Sprung, Horn, Kramer & Woods

[57] ABSTRACT

Disclosed is a soft and flexible thermoplastic resinous composition having high impact and tear resistances, a good processability and a good thermal adhesion to a wide variety of plastic and other materials. The resinous composition consists essentially of 5 to 70 wt. % of a thermoplastic polyurethane elastomer and 30 to 95 wt. % of a modified polyolefin or an olefin copolymer, having functional groups of at least one type selected from carboxyl, carboxylate salt, carboxylic anhydride, amide, hydroxyl and epoxy groups. A typical application of the thermoplastic resinous composition is a laminate having at least two lamine bonded to each other, at least one of the laminae being comprised of the above-mentioned resinous composition and the other being comprised of at least one material selected from vinyl chloride polymer resins, vinylidene chloride polymer resins, thermoplastic polyester resins, ethylene/vinyl alcohol copolymer resins, polyamide resins, polyacrylonitrile and nitrile copolymer resins, polystyrene and styrene copolymer resins, polymethyl methacrylate and acrylic copolymer resins, polyurethane resins, olefin polymer resins, polyacetal resins, polyvinyl acetal resins, polycarbonate resins, polyphenylene oxide resins, polysulfone resins, epoxy resins, phenol-formaldehyde resins, unsaturated polyester resins, melamine-formaldehyde resins, urea-formaldehyde resins, natural and synthetic rubbers, cellulosic materials, cement, glass and other ceramic materials and metals.

9 Claims, No Drawings

LAMINATE OF THERMOPLASTIC RESINOUS COMPOSITION

This is a division of application Ser. No. 126,273, filed Mar. 3, 1980.

BACKGROUND OF THE INVENTION (1) Field of the Invention

This invention relates to a resinous composition having enhanced processability, good soft and flexible characteristics and good thermal adhesive properties.

(2) Description of the Prior Art

As packaging materials, various plastic materials of different characteristics are used so as to meet the diversity of the desired properties. For example, in the field where soft and flexible plastic materials are desired, plasticized polyvinyl chloride has heretofore been predominantly used. However, plasticized polyvinyl chloride packing materials have caused public discussion in that, first, they evolve a corrosive gas upon burning the waste materials thereof, and secondly, remaining unreacted monomers and plasticizers present in the packing materials are detrimental to health. For these reasons, softened polyolefins are recently used, which are polyblends comprised of a polyolefin and a synthetic rubber or a low molecular weight flexibilizing agent. The polyolefin polyblends have some problems, such as high surface sticking, poor resistance to high temperature, oil and chemicals, and increased moisture and gas permeability.

In recent years, multi-layered polyolefin composite materials have been widely used, which are comprised of a polyolefin combined with various plastic materials so as to meet the diversity of the properties desired in packaging materials. These multi-layered polyolefin composite materials are prepared, for example, by co-extrusion, extrusion coating, extrusion laminating, powder coating or another thermal adhesion process. Typical illustrations of the multi-layered polyolefin composite materials are laminates in which a polyolefin is combined with various plastic materials by using a carboxyl group-containing polyolefin binder. However, the carboxyl group-containing polyolefin binder can be used only with limited plastic materials. Thus, the carboxyl group-containing polyolefin binder cannot practically be used for the combination of a polyolefin with a vinyl chloride polymer resin, an acrylic resin, a styrene polymer resin, a high nitrile resin or a polyester resin. It also does not exhibit a satisfactory adhesion to, for example, metals, polyamide resins and saponified ethylene/vinyl carboxylate copolymers.

SUMMARY OF THE INVENTION

An object of the present invention is to provide a flexible thermoplastic resinous composition hving high and impact resistances, a good thermal processability and a good thermal adhesion to a wide variety of plastic and other materials.

Another object of the present invention is to provide a laminate, the laminae of which are adhered to each other with enhanced interlaminar strength.

Other objects and advantages of the present invention will be apparent from the following description.

In one aspect of the present invention, there is provided a thermoplastic resinous composition consisting essentially of, based on the weight of the resinous composition, (a) 5 to 70% by weight of a thermoplastic polyurethane elastomer, and (b) 30 to 95% by weight of a modified polyolefin or olefin copolymer predominantly comprised of an olefin, having functional groups of at least one type selected from the group consisting of a carboxyl group, a carboxylate salt group, a carboxylic anhydride group, an amide group, a hydroxyl group and an epoxy group.

In another aspect of the present invention, there is provided a laminate having at least two laminae bonded to each other;

at least one of the laminae being comprised of a thermoplastic resinous composition consisting essentially of, based on the weight of the resinous composition, (a) 5 to 70% by weight of a thermoplastic polyurethane elastomer, and (b) 30 to 95% by weight of a modified polyolefin or olefin copolymer, having functional groups of at least one type selected from the group consisting of a carboxyl group, a carboxylate group, a carboxylic anhydride group, an amide group, a hydroxyl group and an epoxy group, and the other of the laminae being comprised of at least one material selected from the group consisting of vinyl chloride polymer resins, vinylidene chloride polymer resins, thermoplastic polyester resins, ethylene/vinyl alcohol copolymer resins, polyamide resins, polyacrylonitrile and nitrile copolymer resins comprising at least 50% by weight of units derived from an unsaturated nitrile, polystyrene and styrene copolymer resins, polymethyl methacrylate and acrylic or methacrylic acid ester copolymer resins, polyurethane resins, olefin polymer resins, polyacetal resins, polyvinyl acetal resins, polycarbonate resins, polyphenylene oxide resins, polysulfone resins, epoxy resins, phenol-formaldehyde resins, unsaturated polyester resins, melamine-formaldehyde resins, urea-formaldehyde resins, synthetic rubbers, paper, wood and other cellulosic materials, cements, glass and other ceramic materials and metals.

DESCRIPTION OF THE PREFERRED EMBODIMENTS

The thermoplastic polyurethane elastomer used in the present invention refers to a high polymeric material comprising soft segment and hard segment molecular combination, which is prepared by reacting a bifunctional polyol, a bifunctional low molecular weight compound having active hydrogens, and a diisocyanate, in a proportion such that the molar ratio of the active hydrogen [AH] groups present in the bifunctional polyol and the bifunctional low molecular weight compound to the isocyanate [NCO] groups present in the diisocyanate is approximately 1.

The bifunctional polyol used includes, for example, polyether-diols such as polytetramethylene ether glycol, polyethylene ether glycol and polypropylene ether glycol; and polyester-diols such as polyethylene adipate, poly(1,4-buthylene adipate), poly(1,6-hexane adipate, polytetramethylene sebacate, polycaprolactone and polyhexamethylene carbonate. These bifunctional polyols should preferably possess a molecular weight of from about 500 to about 8,000. These bifunctional polyols may be used alone or in combination.

The bifunctional low molecular weight compound having active hydrogens used includes, for example, glycols usch as ethylene glycol, 1,4-buthylene glycol, 1,6-hexamethylene glycol and bishydroxyethoxybenzene; diamines such as ethylenediamine, 1,4- buthylenediamine, cyclohexanediamine and tolylenediamine; hydrazines such as hydrazine, monoalkylhydrazine and N,N'-diaminopiperazine; dihydrazides such as carbodihydrazide and adipic acid dihydrazide; and water. These bifunctional low molecular weight compounds may be used alone or in combination.

The diisocyanate used includes, for example, diphenylmethane diisocyanate, dicyclohexylmethane diisocyanate, isophorone diisocyanate, tolylene diisocyanate, xylylene diisocyanate, isopropylidene bis(4-phenylisocyanate), tetramethylene diisocyanate and hexamethylene diisocyanate. These diisocyanates may be used alone or in combination.

The thermoplastic polyurethane elastomers used may be classified into two categories, namely, completely more thermoplastic type elastomers and incompletely thermoplastic type elastomers. The former are of a completely linear structure and prepared by employing the [NCO]/[AH] molar ratio of more than 0.5 but not more than 1, preferably more than 0.95 but not more than 1.0. The latter are of a partially crosslinked linear structure and prepared by employing the [NCO][AH] molar ratio of more than 1.0 but less than 1.5, preferably more than 1.0 but less than 1.1. These thermoplastic polyurethane elastomers may be prepared in a conventional manner by employing a bulk or solution polymerization procedure.

The modified polyolefin or olefin copolymer used in the present invention has in the main chain or the side chains functional groups of at least one type selected from a carboxyl group, a carboxylate salt group, a carboxylic anhydride group, an amide group, a hydroxyl group and an epoxy group. Such a modified polyolefin or olefin copolymer is hereinafter referred to as "modified olefin polymer" for brevity.

One typical example of the modified olefin polymers is a modified polyolefin which is prepared by graft-polymerizing an unsaturated carboxylic acid or its functional derivative or another functional group-containing vinyl monomer onto an olefin polymer. The olefin polymer, onto which the unsaturated carboxylic acid or its functional derivative or another functional group-containing vinyl monomer is to be grafted, includes, for example, polyolefins such as a high density polyethylene, a medium density polyethylene, a low density polyethylene, polypropylene, polybutene, poly-4-methyl-pentene-1, an ethylene/α-olefin copolymer and a propylen/α-olefin copolymer; polyolefin elastomers such as an ethylene/propylene copolymer rubber, an ethylene/propylene/diene terpolymer rubber, a butyl rubber and a butadiene polymer rubber, thermoplastic polyolefin elastomers such as a poorly crystalline ethylene-propylene copolymer, a poorly crystalline ethylene-butene copolymer, a poorly crystalline propylene-butene copolymer and a polyblend of a polyolefin with a rubber; and an ethylene/carboxylic acid vinyl ester copolymer and an ethylene/acrylic acid ester copolymer. These olefin polymers may be used alone or in combination.

The unsaturated carboxylic acid or its functional derivative or another functional group-containing vinyl monomer, which is to be grafted onto the above-mentioned olefin polymer, includes, for example, carboxylic acids such as acrylic acid, methacrylic acid, maleic acid, fumaric acid, itaconic acid and sorbic acid; acid anhydrides such as maleic anhydride and itaconic anhydride; acid amides such as acrylamide and methacrylamide; epoxy group-containing compounds such as glycidyl acrylate and glycidyl methacrylate; hydroxyl group-containing esters such as 2-hydroxyethyl acrylate, 2-hydroxyethyl methacrylate and polyethylene glycol monoacrylate; and metal salts such as sodium acrylate, sodium methacrylate and zinc acrylate. These graft monomers may be used alone or in combination. Of these graft monomers, acrylic acid, maleic acid and maleic anhydride are preferable. The above-mentioned graft monomers may also be used in combination with other monomers such as styrene, vinyl acetate, acrylic acid esters and methacrylic acid esters.

The amount of the above-mentioned graft monomer grafted onto the olefin polymer may be varied depending upon the particular graft monomer, preferably within the range of from 0.005 to 5% by mole, more preferably form 0.01 to 1.0% by mole, per mole of the recurring unit in the olefin polymer. When the amount of the graft monomer is less than 0.005% by mole, the resulting thermoplastic resinous composition does not exhibit the intended properties. In contrast, when the amount of the graft monomer exceeds 5% by mole, the processability and thermal stability of the resulting thermoplastic resinous composition are reduced.

The graft-copolymerization of the unsaturated carboxylic acid or its functional derivative or another functional group-containing vinyl monomer onto the olefin polymer can be conducted by various methods. For example, in one method, the olefin polymer, the graft monomer and a free-radical initiator are mixed together and kneaded in a molten state. In another method, the graft monomer and a free-radical initiator are incorporated in a solution or suspension of the olefin polymer in a suitable solvent. It is also possible to conduct the graft copolymerization in the presence of the thermoplastic polyurethane elastomer, i.e., after being blended with the thermoplastic polyurethane elastomer.

Another typical example of the modified olefin polymers is a saponified product of an ethylene/vinyl carboxylate copolymer or a modified product of the saponified product, which modified product is prepared by graft-copolymerizing an unsaturated carboxylic acid or its functional derivative or another functional group-containing vinyl monomer onto the saponified product. The ethylene/vinyl carboxylate copolymer is to be saponified is preferably comprised of at least 50% by mole of ethylene and not more than 50% by mole of vinyl carboxylate. The vinyl carboxylate includes, for example, vinyl acetate, vinyl propionate and vinyl butyrate. The saponified ethylene/vinyl carboxylate copolymer should preferably have a saponification degree of from 10 to 100% for obtaining the resinous composition of the desired properties. In the case where a graft monomer, i.e., an unsaturated carboxylic acid or its functional derivative or another functional group-containing vinyl monomer, is grafted onto the saponified ethylene/vinyl carboxylate copolymer, all of the graft copolymerization procedure, the type of the graft monomer used and the amount of the graft monomer may be similar to those which were hereinbefore explained with respect to the graft copolymerization of the graft monomer onto the olefin polymer.

Still another typical example of the modified olefin polymers is a copolymer comprised of units derived from at least one α-olefin monomer and units derived from at least one monomer selected from unsaturated carboxylic acids or their functional derivatives or other functional group-containing vinyl monomers. The α- olefin monomer used may be selected from those which are used for the preparation of the hereinbefore mentioned olefin polymers to be grafted. The unsaturated carboxylic acids or their functional derivatives or other functional group-containing vinyl monomers may be selected from those which were hereinbefore mentioned with respect to the graft monomers. The amount of the α-olefin monomer in the copolymer is preferably at least 50% by mole. Ionomer resins, i.e., partial metal salts of an α-olefin/unsaturated carboxylic acid copolymer, may also be used as the copolymer type modified olefin polymer.

The above-mentioned copolymer type modified olefin polymers include, for example, an ethylene/acrylic acid copolymer, an ethylene/methacrylic acid copolymer, an ethylene/acrylic acid/methacrylic acid ester copolymer, a partial metal salt, i.e., ionomer, of an ethylene/acrylic acid/methacrylic acid ester copolymer and a partial metal salt, i.e., ionomer, of an ethylene/acrylic acid copolymer.

The above-mentioned modified olefin polymers may be used either alone or in combination.

The amounts of the thermoplastic polyurethane elastomer and the modified olefin polymer should be from 5 to 70% by weight and 30 to 95% by weight, respectively, based on the weight of the thermoplastic resinous composition of the invention. The suitable proportion of the thermoplastic polyurethane elastomer to the modified olefin polymer may be varied within the above-mentioned ranges, depending upon the intended use. When the resinous composition of the invention is intended to be used as a flexible plastic material, it is preferable that the amounts of the thermoplastic urethane elastomer and the modified olefin polymer are in the ranges of from 10 to 50% by weight and from 50 to 90% by weight, respectively. When the resinous composition of the invention is intended to be used as an adhesive, it is preferable that the amount of the thermoplastic urethane elastomer is in the range of from 10 to 60% by weight, particularly from 20 to 60% by weight, and the amount of the modified olefin polymer is in the range of from 40 to 90% by weight, particularly 40 to 80% by weight.

In the case where the thermoplastic resinous composition of the invention is intended to be used as an adhesive, the resinous composition should preferably possess the following dispersion structure. That is, when the resinous composition is applied to an adherend which exhibits good adhesion to the thermoplastic polyurethane elastomer but poor adhesion to the modified olefin polymer, it is preferable that the resinous composition possesses a dispersion structure such that islands (discontinuous phase) of the modified olefin polymer are dispersed in a sea (continuous phase) of the polyurethane elastomer. In contrast, when the resinous composition is applied to an adherend exhibiting good adhesion to the modified olefin polymer but poor adhesion to the polyurethane elastomer, it is preferable that the resinous composition possesses a dispersion structure such that islands (discontinuous phase) of the polyurethane elastomer are dispersed in a sea (continuous phase) of the modified olefin polymer. Furthermore, when the resinous composition is applied simultaneously to two adherends, one of which exhibits better adhesion to the polyurethane elastomer rather than to the modified olefin polymer and the other of which exhibits better adhesion to the modified olefin polymer rather than to the polyurethane elastomer, it is preferable that the resinous composition possesses an intermingled dispersion structure such that islands of the modified olefin polymer are dispersed in discrete portions of the sea comprised of the polyurethane elastomer and islands of the polyurethane elastomer are dispersed in discrete portions of the sea comprised of the modified olefin polymer. It now has been found that, even if islands of one of the modified olefin polymer and the polyurethane elastomer are dispersed in a single sea ingredient of the other polymeric material, the resinous composition exhibits good adhesive properties similar to those of the resinous composition having the above-mentioned intermingled dispersion structure provided that the average length of the minor axis of the island particles is not larger than about 100 microns. The smaller the average length of the minor axis of the island particles, the better the adhesive properties. It is preferable that the average length of the minor axis of the island particles be below 20 microns, particularly below 10 microns. When the average minor axis length exceeds about 100 microns, the thermoplastic resinous composition exhibits a low adhesion upon thermal adhering as well as poor impact and tear resistance and processability. The amounts of the modified olefin polymer and the polyurethane elastomer, by which the above-mentioned good adhesive properties are attainable, vary depending upon the melt viscosities of the two polymeric materials, the chemical affinity therebetween and the methods of preparing the resinous composition and of fabricating the thermoplastic resinous composition. However, suitable amounts of the two polymeric materials can be easily determined within the hereinbefore mentioned ranges.

The thermoplastic resinous composition of the invention may conveniently be prepared by melt-mixing the modified olefin polymer and the polyurethane elastomer at an elevated temperature. The apparatus used includes, for example, a single screw extruder, a double screw extruder, a Banbury mixer, a kneader and a mixing roll. The degree of mixing influences the dispersion structure and physical properties of the thermoplastic resinous composition. It is preferable that the degree of mixing be as high as possible provided that the two polymeric materials are not thermally degraded.

The thermoplastic resinous composition of the invention may have incorporated therein additional polymeric materials such as other synthetic elastomers provided that the resultant thermoplastic resinous composition exhibits the intended properties. Scrap shaped articles of the thermoplastic resinous composition may be incorporated with fresh raw materials. Various additives such as a stabilizer, an ultraviolet absorber, a lubricant, an antistatic agent, a filler, a fibrous reinforcement material, a fire retardant, a tackifier, a dye and a pigment may be incorporated in the resinous composition.

The resinous composition of the invention possesses good flexible thermoplastic characteristics, due to the fact that the modified olefin polymer and the thermoplastic polyurethane elastomer are compatible with each other and form a uniform dispersion. Furthermore, the resinous composition possesses enhanced impact and tear resistances, low surface tackiness, good oil resistance and good thermal resistance. It also exhibits excellent thermal adhesion to a wide variety of materials.

The thermoplastic resinous composition of the invention can be shaped or processed into various articles by conventional procedures such as, for example, compression molding, injection molding, extrusion molding, blow molding, film and sheet fabricating, thermoforming, rotational molding, calendering, foam processing, stretching and surface processing. Co-extrusion techniques such as co-extrusion film forming, co-extrusion blow molding, co-extrusion sheet forming and co-extrusion coating, and laminating and extrusion coating techniques, and various thermal adhesion processes may also be employed for the production of multi-layered composite articles.

A typical and important application of the above-mentioned thermoplastic resinous composition of the invention is as a laminate having at least two laminae bonded to each other, at least one of the laminae being comprised of the thermoplastic resinous composition of the invention and the other laminae being comprised of at least one material selected from vinyl chloride polymer resins, vinylidene chloride polymer resins, thermoplastic polyester resins, ethylene/vinyl alcohol copolymer resins, polyamide resins, polyacrylonitrile and nitrile copolymer resins comprising at least 50% by weight of units derived from an unsaturated nitrile, polystyrene and styrene copolymer resins, polymethyl methacrylate and acrylic copolymer resins, polyurethane resins, olefin polymer resins, polyacetal resins, polyvinyl acetal resins, polycarbonate resins, polyphenylene oxide resins and polysulfone resins; thermosetting resins such as epoxy resins, phenol-formaldehyde resins, unsaturated polyester resins, melamine-formaldehyde resins and urea-formaldehyde resins; natural and synthetic rubbers, paper, wood and other cellulosic materials; cements, glass and other ceramic materials; and metals.

The above-mentioned laminate will be described in detail. The materials forming the laminae bonded to the lamina (which lamina is hereinafter referred to as "lamina (a)" for brevity) of the thermoplastic resinous composition of the invention are classified into the following groups, (b) through (n), for convenience sake.

(b) Vinyl chloride polymer resins and vinylidene chloride polymer resins

The terms "vinyl chloride polymer resin" and "vinylidene chloride polymer resin" herein used refer to homopolymers of vinyl chloride and vinylidene chloride and copolymers predominantly comprised of vinyl chloride or vinylidene chloride. Comonomers to be copolymerized with vinyl chloride and/or vinylidene chloride include, for example, vinyl acetate, acrylic acid esters, acrylonitrile, olefins and maleic acid derivatives. Optimum vinylidene chloride copolymers are comprised of 70 to 90% by weight of vinylidene chloride and 10 to 30% by weight of vinyl chloride. The above-mentioned terms should also be interpreted as including modified polymers such as after-chlorinated polyvinyl chloride, vinyl chloride-grafted polyolefin or vinyl chloride-grafted ethylene/vinyl acetate copolymer and further including polyblends predominantly comprised of the above-mentioned vinyl chloride or vinylidene chloride homopolymer and copolymer. Polymeric materials to be blended with the vinyl chloride or vinylidene chloride homopolymer or copolymer include, for example, an ABS resin, an MBS resin, polyurethane and chlorinated polyethylene.

The above-mentioned vinyl chloride polymer resins and vinylidene chloride polymer resins may be used alone or in combination. These polymer resins may have additives incorporated therein, such as a stabilizer, a plasticizer, a lubricant and a filler.

(c) Olefin polymer resins

The olefin polymer resins used include the modified olefin polymers, hereinbefore mentioned, used for the preparation of the thermoplastic resinous composition of the invention, and further include the unmodified olefin homopolymers and copolymers, hereinbefore mentioned, used for the preparation of the modified olefin polymers.

It is advantageous to use the same olefin polymer resin as that used for the preparation of the lamina (a) from standpoints of adhesion and processability.

(d) Thermoplastic polyester resins

The term "thermoplastic polyester resins" herein used refers to thermoplastic polymeric materials, the backbone chains of which comprise ester linkages as the main linkage. The thermoplastic polyester resins include, for example, polyethylene terephthalate, polybutylene terephthalate, polyethylene terephthalate/isophthalate copolyesters and polyethylene terephthalate/adipate copolyesters. The laminae formed from these thermoplastic polyester resins may be either undrawn or uniaxially or biaxially drawn.

(e) Ethylene/vinyl alcohol copolymer resins

The term "ethylene/vinyl alcohol compolymer resins" herein used refers to saponified products of an ethylene/vinyl acetate copolymer. A preferable saponified ethylene/vinyl acetate copolymer has an ethylene content of from 15 to 50% by mole and a saponification degree of at least 90%. When the ethylene content is outside this range and the saponification degree is below 90%, the gas permeability of the lamina is not satisfactorily balanced with the processability and physical properties of the lamina. The lamina of the ethylene/vinyl alcohol copolymer may have incorporated therein other polymeric materials such as olefin polymer resins (c), mentioned above, and the thermoplastic resinous composition of the invention, provided that the gas permeability of the lamina is not increased to a practically unacceptable extent. Additives such as a thermal stabilizer, a plasticizer and a lubricant may also be incorporated therein.

(f) Polyamide resins

The term "polyamide resins" herein used refers to thermoplastic polymeric materials, the backbone chains of which comprise amide linkages as the main linkage. The polyamide resins include, for example, nylon 6, nylon 66, nylon 10, nylon 11, nylon 12, nylon 610, polymetaxylylene adipamide and polymetaxylylene sebacamide. The laminae of these polyamide resins may be either undrawn or uniaxially or biaxially drawn.

(g) Polyacrylonitrile and nitrile copolymer resins

The nitrile copolymer resin used refers to copolymers comprised of at least 50% by weight of units derived from an unsaturated nitrile and not more than 50% by weight of units derived from other copolymerizable monomer or monomers. Nitirile copolymers containing below 50% by weight of units derived from an unsaturated nitrile are not preferable because of poor gas barrier properties. The unsaturated nitrile includes, for example, acrylonitrile and methacrylonitrile. The monomers to be copolymerized with the unsaturated nitrile include, for example, acrylic acid ester, vinyl carboxylate ester, vinyl halides, vinyl aromatic compounds, unsaturated carboxylic acids and dienes. The nitrile copolymer resins used may be any form of random copolymers, graft copolymers, block copolymers and alternating copolymers. The nitrile copolymer resins may be used either alone or in combination. The nitrile copolymer resins may also be used as its polyblend with other polymers and rubbers, such as nitrile rubbers, acrylic rubbers and polystyrene.

In general, polyacrylonitrile and nitrile copolymers containing at least 85% by weight of units derived from an unsaturated nitrile are difficult to form into a fiber, film or sheet by a melt forming procedure, and therefore, the laminae of these polymeric materials are formed by a wet forming procedure. Nitrile copolymers containing less than 85% by weight of units derived from an unsaturated nitrile can be formed into a film or sheet by a melt forming procedure, and furthermore, can be co-extruded with the thermoplastic resinous composition of the invention by a co-extrusion blow molding or co-extrusion film forming procedure.

(h) Polystyrene and styrene copolymer resins

The polystyrene and styrene copolymer resins may be selected from, for example, general-purpose polystyrene, high-impact polystyrene, an AS resin (acrylonitrile/styrene copolymer) and an ABS resin (acrylonitrile/butadiene/styrene copolymer). These polymer resins may be used either alone or in combination. The laminae of these polymer resins may be of a foam form.

(i) Polymethyl methacrylate and acrylic copolymer resins

The acrylic copolymer resins include copolymers comprised of units derived from a methacrylic acid ester such as methyl methacrylate or an acrylic acid ester and units derived from vinyl carboxylate and other copolymerizable monomers.

(j) Polyurethane resins

The polyurethane resins used include thermoplastic polyurethane elastomers similar to those hereinbefore mentioned with respect to the thermoplastic resinous composition of the invention and further include other polyurethane resins prepared from polyisocyanate, polyol and an optional polyfunctional active hydrogen-containing compound. The laminae of the polyurethane resins may be formed from the material of any form such as foams, fibers, leather-like sheets, molded articles paint-like liquids and pastes. The polyurethane resins may be either vulcanized or unvulcanized.

(k) Synthetic and natural rubbers

The synthetic rubbers used include, for example, SBR(styrene-butadiene rubber), BR(butadiene rubber), IR(isoprene rubber), IIR(isobutylene-isoprene rubber), EPR(ethylene-propylene rubber), EPDM (ethylene-propylene-diene terpolymer), CR(chloroprene rubber), NBR(acrylonitrile-butadiene rubber), CSM(chlorosulfonated polyethyene), acrylic rubber, silicone rubber and various thermoplastic elastomers. The natural and synthetic rubbers may be used either alone or in combination. These rubbers may have additives incorporated therein, such as a filler and a reinforcing agent, and they may be either vulcanized or unvulcanized.

(l) Cellulosic materials

Typical examples of the cellulosic materials are paper and wood. The paper and wood may be subjected to various treatments. They may be printed or coated.

(m) Ceramics

The ceramics used include, for example, cement, glass, enamel, pottery and refractor. The ceramics are compounds, solid solutions or vitreous materials, comprised of at least one ingredient of oxides of Si, Al, Fe, Ca, Mg, Na, K, Ti, P, B, S and H and occasionally carbides, borides and silicides.

(n) Metals

The metals used may be either those which have structural rigidity, such as iron, stainless steel and other iron alloys, aluminum, copper, zinc and magnesium, or deposited metals such as copper, chromium, nickel and zinc, formed on the other structural materials, for example, by plating, vapor deposition or spattering.

The laminate comprised of at least one lamina (a) of the thermoplastic resinous composition of the invention and at least one lamina of the above-mentioned (b) through (n) may be produced by a conventional procedure such as, for example, co-extrusion forming extrusion laminating, multi-layer injection, or thermal adhesion process such as hot rolling or hot pressing. When all of the laminae bonded together are composed of only thermoplastic materials, it is preferable that the respective materials are melt-extruded separately by using a plurality of extruders, and the extruded molten materials are joined together within a circular or T die, thereby to form a multi-layer film, a multi-layer sheet or a multi-layer hollow article.

It is possible that the thermoplastic resinous composition of the invention is melt-extruded alone or co-extruded with an olefin polymer resin (i.e., the above-mentioned (c)) or another thermoplastic material to form a molten lamina or laminae, and then, the extruded, molten lamina or laminae are laminated by an extrusion laminating procedure with a drawn or undrawn film or sheet of a polyamide, polyester, polyolefin, vinyl chloride or viylidene chloride polymer, an ethylene/vinyl alcohol copolymer or a nitrile copolymer. The temperature at which the laminate is formed may be varied within the temperature range of from the softening point of the polymeric material used to the temperature at which the polymeric material is thermally degraded. However, the preferable temperature range is usually from 150° to 230° C. Furthermore, when the laminate is formed by a co-extrusion procedure, it is preferable that the polymeric materials forming the respective laminae have melt viscosities close to each other from a standpoint of adhesion and processability.

It is also possible that the resinous composition of the invention is formed into a film, sheet or tape; and then, the film, sheet or tape is placed on a film, sheet or tape of the material selected from the above-mentioned (b) through (n), or sandwiched between films, sheets or tapes of the material or materials of (b) through (n), followed by hot pressing the films, sheets or tapes superposed upon another, thereby to make a laminate.

The laminate having at least one lamina (a) of the thermoplastic resinous composition of the invention may have various laminar structures. Beside double laminar structures comprised of a lamina (a) and a lamina of (b) through (n), the laminate may have triple laminar structures having a sandwiched lamina (a), such as, for example, (b)/(a)/(b) and (c)/(a)/(b), or multilaminar structures such as, for example, (c)/(a)/(b)/(a)/(c), (c)/(a)/(b)/(a)/(f) and (c)/(a)/(d)/(a)/(n).

Typical examples of preferable laminar structures are as follows. First type laminates comprise a lamina (a) of the thermoplastic resinous composition of the invention, a lamina of a vinyl chloride polymer or vinylidene chloride polymer resin (b) and an optional lamina of an olefin polymer resin (c), and have a laminar structure selected from (a)/(b), (a)/(b)/(a), (c)/(a)/(b), (c)/(a)/(b)/(a) and (c)/(a)/(b)/(a)/(c).

Second type laminates comprise the lamina (a), a lamina of a thermoplastic polyester resin (d) and an optional lamina of an olefin polymer resin (c), and have a laminar structure selected from (a)/(d), (a)/(d)/(a), (c)/(a)/(d), (c)/(a)/(d)/(a) and (c)/(a)/(d)/(a)/(c).

Third type laminates comprise the lamina (a), a lamina of an ethylene/vinyl alcohol copolymer resin (e) and, an optional lamina of an olefin polymer resin (c), and have a laminar structure selected from (a)/(e), (a)/(e)/(a), (c)/(a)/(e), (c)/(a)/(e)/(a) and (c)/(a)/(e)/(a)/(c).

Fourth type laminates comprise the lamina (a), a lamina of a polyamide resin (f) and an optional lamina of an olefin polymer resin (c), and have a laminar structure selected from (a)/(f), (a)/(f)/(a), (c)/(a)/(f), (c)/(a)/(f)/(a) and (c)/(a)/(f)/(a)/(c).

Fifth type laminates comprise the lamina (a), a lamina of a polyacrylonitrile or nitrile copolymer resin (g) and an optional lamina of an olefin polymer resin (c), and have a laminar structure selected from (a)/(g), (a)/(g)/(a), (c)/(a)/(g), (c)/(a)/(g)/(c) and (c)/(a)/(g)/(a)/(c).

Sixth type laminates comprise the lamina (a) and at least two laminae selected from a lamina of a vinyl chloride polymer or vinylidene chloride polymer resin (b), a lamina of an olefin polymer resin (c), a lamina of a thermoplastic polyester resin (d), a lamina of an ethylene/vinyl acetate copolymer resin (e), a lamina of a polyamide resin (f) and a lamina of a polyacrylonitrile or nitrile copolymer resin (g), and have a laminar structure selected from (b)/(a)/(d), (b)/(a)/(e), (b)/(a)/(f), (b)/(a)/(g), (d)/(a)/(e), (d)/(a)/(f), (d)/(a)/(g), (e)/(a)/(f), (e)/(a)/(g), (f)/(a)/(g), (c)/(a)/(b)/(a)/(d), (c)/(a)/(b)/(a)/(e), (c)/(a)/(b)/(a)/(f), (c)/(a)/(b)/(a)/(g), (c)/(a)/(d)/(a)/(b), (c)/(a)/(d)/(a)/(e), (c)/(a)/(d)/(a)/(f), (c)/(a)/(d)/(a)/(g), (c)/(a)/(e)/(a)/(b), (c)/(a)/(e)/(a)/(d), (c)/(a)/(e)/(a)/(f), (c)/(a)/(e)/(a)/(g), (c)/(a)/(f)/(a)/(b), (c)/(a)/(f)/(a)/(d), (c)/(a)/(f)/(a)/(e), (c)/(a)/(f)/(a)/(g), (c)/(a)/(g)/(a)/(b), (c)/(a)/(g)/(a)/(d), (c)/(a)/(g)/(a)/(e) and (c)/(a)/(g)/(a)/(f).

Seventh type laminates comprise the lamina (a) and at least one lamina selected from a lamina of an olefin polymer (c), a lamina of a polystyrene or styrene copolymer resin (h), a polymethyl methacrylate or acrylic copolymer resin (i) and a lamina (X) of a material selected from a vinyl chloride polymer or vinylidene chloride polymer resin (b), a thermoplastic polyester resin (d), an ethylene/vinyl alcohol copolymer resin (e), a polyamide resin (f) and a polyacrylonitrile or nitrile copolymer resin (g). The seventh type laminates have a laminar structure selected from (a)/(b), (a)/(i), (h)/(a)/(i), (X)/(a)/(h), (X)/(a)/(i), (c)/(a)/(X)/(a)/(h), (c)/(a)/(X)/(a)/(i)/ and (h)/(a)/(X)/(a)/(i).

Eight type laminates comprise the laminate (a) and at least one lamina selected from a lamina of a polyurethane resin (j), a lamina of a natural or synthetic rubber (k), a lamina of a cellulosic material (l), a lamina of a ceramic material (m), a lamina of a metal (n) and a lamina (Y) of a material selected from a vinyl chloride polymer or vinylidene chloride polymer resin (b), an olefin polymer (c), a thermoplastic polyester resin (d), an ethylene/vinyl alcohol copolymer resin (e), a polyamide resin (f), a polyacrylonitrile or nitrile copolymer resin (g), a polystyrene or styrene copolymer resin (h) and a polymethyl methacrylate or acrylic copolymer resin (i). The eighth type laminates have a laminar structure selected from (a)/(j), (a)/(k), (a)/(l), (a)/(m), (a)/(n), (Y)/(a)/(j), (Y)/(a)/(k), (Y)/(a)/(l), (Y)/(a)/(m), (Y)/(a)/(n), (j)/(a)/(k), (j)/(a)/(l), (j)/(a)/(m), (j)/(a)/(n), (k)/(a)/(l), (k)/(a)/(m), (k)/(a)/(n), (l)/(a)/(m), (l)/(a)/(n), (m)/(a)/(n), (l)/(a)/(l), (m)/(a)/(m) and (n)/(a)/(n).

The thickness of the respective laminae of the above-mentioned laminate can be suitably varied depending upon the desired properties of the laminate and upon the manufacturing cost. The shape of the laminate can be any of film, sheet, sheet, pipe and other profile articles, and hollow articles.

The above-mentioned laminate can be united with one or more layers of other materials by a procedure different from the procedures employed for the above-mentioned laminate, such as for example dry laminating, wet laminating or thermal laminating, thereby to obtain a laminate of a high order.

The above-mentioned laminate having a lamina or laminae of the thermoplastic resinous composition of the invention exhibits good interlaminar strength, and, even when the laminate is used under severe conditions, the laminae are not separated from each other. Furthermore, various polymeric materials of different properties, such as olefin polymer resins (c), polyamide resins (f), vinyl chloride polymer and vinylidene chloride polymer resins (b), thermoplastic polyester resins (d) and ethylene/vinyl alcohol copolymer resins (e), can be optionally combined with the thermoplastic resinous composition of the invention. Therefore, the laminate can possess desired properties such as moisture and gas barrier properties, rigidity, mechanical strength, thermal resistance, heat-sealability, water resistance oil resistance and chemical resistance. Thus, the laminate can be of wide applications such as, for example, containers and packaging materials for food, drugs and cosmetics.

The package can be placed in boiling water or sterilized at a high temperature.

Furthermore, when polystyrene or a styrene copolymer (h) and/or polymethyl methacrylate or acrylic copolymer (i) is used in combination with the above-mentioned polymeric materials (b), (c), (d), (e), (f) and (g) and the thermoplastic resinous composition of the invention, the resulting laminates can possess enhanced rigidity, surface hardness and decoratability, in addition to the above-mentioned properties attained by using the polymeric materials (b), (c), (d), (e), (f) and (g).

When polyurethane resins (j) are used in combination with the polymeric materials (b), (c), (d), (e), (f), (g), (h) and (i) and the thermoplastic resinous composition of the invention, the resulting laminates exhibit far enhanced chemical resistance ad gas barrier properties and far reduced moisture permeability, as compared with a polyurethane film or sheet. That is, the resulting laminates possess the advantageous properties of the polymeric materials (b) through (i), as well as the advantageous properties of polyurethane.

When natural and synthetic rubbers (k) are used in combination with the polymeric materials (b) through (i) and the thermoplastic resinous composition of the invention, the resulting laminates exhibit far enhanced chemical resistance, oil resistance, gas barrier properties, abrasion and wear resistance and decoratability and far reduced moisture permeability, as compared with a natural or synthetic rubber film or sheet. That is, the resulting laminates possess the advantageous properties of the polymeric materials (b) through (i), as well as the advantageous properties of a natural or synthetic rubber.

When cellulosic materials (l) such as paper and wood are used in combination with the polymeric materials (b) through (k) and the thermoplastic resinous composition of the invention, the resulting laminates exhibit far enhanced water resistance, surface hardness and decoratability and far reduced air permeability and heat sealability, as compared with paper or a cellulosic film or sheet. That is, the resulting laminates possess the advantageous properties of the polymeric materials (b) through (k), as well as the advantageous properties of cellulosic materials.

When ceramic materials (m) such as cement, glass and pottery are used in combination with the polymeric materials (b) through (k), and the thermoplastic resinous composition of the invention, the resulting laminates exhibit far enhanced fracture resistance and decoratability and heat sealability, as compared with ceramic material sheets. That is, the resulting laminates possess the advantageous properties of the polymeric materials (b) through (k), as well as the advantageous properties of ceramic materials.

When metals (n) are used in combination with the polymeric materials (b) through (k) and the thermoplastic resinous composition of the invention, the resulting laminates exhibit far enhanced anticorrosion, decoratability, scuffing resistance and heat sealibility, as compared with metal sheets. That is, the resulting laminates possess the advantageous properties of the polymeric materials (b) through (k) and the advantageous properties of metals. Such metal laminates are, for example, inner and outer resin-coated steel pipes, inner and outer resin-coated food cans, packaging film materials comprised of an aluminum foil bonded with a gas barrier resin layer, and a decorative paper comprised of paper bonded with a metal-deposited polyester film.

The invention will be understood more readily with reference to the following examples, which are, however, intended to illustrate the invention and not to be construed as limiting the scope of the invention. Unless otherwise specified, "parts" and "percents" expressing quantities are by weight.

EXAMPLE 1

A high density polyethylene and maleic anhydride were melt-mixed in the presence of a free-radical initiator to obtain a maleic anhydride-grafted high density polyethylene having a melt index (hereinafter referred to as "MI" for brevity) of 0.3, a density of 0.953 g/cm$^3$ and a maleic anhydride content of 0.1%. The maleic anhydride-grafted high density polyethylene was mixed with a completely thermoplastic type polyurethane elastomer (trade name "Paraprene P22S", supplied by Nippon Polyurethane Co.) in the proportions shown in Table I, below. The respective mixtures were melt-mixed through an extruder at a temperature of 190° C. to obtain pellets.

The pellets were molded into sheets by compression molding. The tensile properties of the sheets were tested. The results are shown in Table I, below.

COMPARATIVE EXAMPLE 1

Following a procedure similar to that mentioned in Example 1, thermoplastic sheets were prepared wherein an unmodified high density polyethylene having a MI of 0.3 and a density of 0.953 was used in place of the modified (i.e., Maleic anhydride-grafted) high density polyethylene. All other conditions remained substantially the same. The tensile properties of the sheets are shown in the following Table I.

TABLE I

| Run No. | Composition (Parts) Polyethylene | Elastomer | Tensile stress at 100% elongation (kg/cm$^2$) | Tensile strength (kg/cm$^2$) | Elongation (%) |
|---|---|---|---|---|---|
| Example 1-1 | Modified 80 | 20 | 190 | 240 | 850 |
| Example 1-2 | Modified 70 | 30 | 150 | 200 | 800 |
| Example 1-3 | Modified 60 | 40 | 130 | 170 | 800 |
| Example 1-4 | Modified 50 | 50 | 115 | 160 | 750 |
| Example 1-5 | Modified 40 | 60 | 100 | 140 | 700 |
| Comp. Ex. 1-1 | Unmodified 100 | 0 | 250 | 300 | 900 |
| Comp. Ex. 1-2 | Unmodified 80 | 20 | 180 | 220 | 800 |
| Comp. Ex. 1-3 | Unmodified 60 | 40 | 110 | 160 | 600 |
| Comp. Ex. 1-4 | Unmodified 40 | 60 | 80 | 120 | 520 |
| Comp. Ex. 1-5 | Unmodified 0 | 100 | 40 | 500 | 600 |

EXAMPLE 2

Following a procedure similar to that mentioned in Example 1, thermoplastic sheets were prepared wherein various thermoplastic polyurethane elastomers, shown in Table II, below, were used in place of Paraprene P22S, and the proportion of the maleic anhydride-grafted high density polyethylene to each polyurethane elastomer was 60/40 by weight. All other conditions remained substantially the same. The tensile properties of the sheets are shown in Table II, below.

COMPARATIVE EXAMPLE 2

Following a procedure similar to that employed in Example 2, thermoplastic sheets were prepared wherein an unmodified high density polyethylene similar to that used in Comparative Example 1 was used in place of the modified high density polyethylene. All other conditions remained substantially the same. The tensile properties of the sheets are shown in the following Table II.

TABLE II

| Run No. | Polyurethane elastomer (Trade name) | Tensile stress at 100% elongation (kg/cm$^2$) | Tensile strength (kg/cm$^2$) | Elongation (%) |
|---|---|---|---|---|
| Example 2-1 | DESMOPAN 485*[1] | 140 | 180 | 820 |
| Example 2-2 | ROYLAR E85*[2] | 150 | 180 | 800 |
| Example 2-3 | PELLETHENE 2102-80A*[3] | 130 | 180 | 850 |
| Example 2-4 | TEXIN 480A*[4] | 140 | 190 | 800 |
| Comp. Ex. 2-1 | DESMOPAN 485*[1] | 120 | 160 | 600 |
| Comp. Ex. 2-2 | ROYLAR E85*[2] | 120 | 170 | 600 |
| Comp. Ex. 2-3 | PELLETHENE 2102-80A*[3] | 110 | 160 | 600 |
| Comp. Ex. 2-4 | TEXIN 480A*[4] | 110 | 160 | 550 |

*[1]Supplied by Sumitomo-Bayer Urethane Co.
*[2]Supplied by Uniroyal Co.
*[3]Supplied by Kasei Upjohn Co.
*[4]Supplied by Mobay Chemical Co.

EXAMPLE 3

A low density polyethylene having an MI of 2 (which polyethylene is abbreviated as "III") and maleic anhydride were melt-mixed in the presence of a free-radical initiator to obtain a maleic anhydride-grafted low density polyethylene having an MI of 1.2, a density of 0.919 g/cm$^3$ and a maleic anhydride content of 0.2% (which polyethylene is abbreviated as "I").

A low density polyethylene having an MI of 5 (which polyethylene is abbreviated as "IV") and maleic anhydride were mixed together, and milled in a molten state in the presence of a free-radical initiator to obtain a maleic anhydride-grafted low density polyethylene having an MI of 1.5, a density of 0.918 g/cm$^3$ and a maleic anhydride content of 0.5% (which polyethylene is abbreviated as "II").

Each of the modified polyethylenes I and II was mixed with a thermoplastic polyurethane elastomer similar to that used in Example 1, in the proportions shown in Table III, below. The respective mixtures were melt-mixed through an extruder at a temperature of 190° C. to obtain pellets. The pellets were melt-processed through a blown-film fabricator to obtain films having a thickness of 40 microns.

The flexibility of the films was tested by a falling weight impact test method, wherein the radius of the steel ball was 1.8 cm and the falling height was 50 cm. The test results are shown in Table III, below.

Furthermore, the dispersion structure of the films was tested as follows. The films were dyed with a disperse dye capable of dyeing the polyurethane elastomer but incapable of dyeing the polyethylene. The dispersion structure of the dyed films were observed by using a microscope. The results are shown in Table III, below, wherein "A/B" indicates that the polyurethane elastomer phase constitutes islands dispersed in a sea of the polyethylene phase, and "AxB" indicates that it is not clear which constitutes a sea or islands, the polyurethane elastomer phase or the polyethylene phase. All of the polyurethane elastomer islands had a minor axis length of less than 100 microns. Substantial part of the polyurethane elastomer islands had a minor axis length of less than 10 microns.

COMPARATIVE EXAMPLE 3

Following a procedure similar to that mentioned in Example 3, films were prepared wherein the unmodified low density polyethylenes III and IV were used in place of the modified low density polyethylenes I and II, respectively. All other conditions remained substantially the same. In the preparation of these films, the polyblends generally exhibited increased blocking of each other and of a winding roll, and hence, could not be processed without difficulty. The falling weight impact strengths of the films and the dispersion structures thereof are shown in the following Table III. Substantial part of the polyurethane elastomer islands had a minor axis length of more than 20 microns. A minor part of the islands had a minor axis length of more than 100 microns.

TABLE III

| Run No. | Composition (parts) | | Falling weight impact strength (kg · cm) | Dispersion structure |
|---|---|---|---|---|
| | Polyethylene | Elastomer | | |
| Example 3-1 | (I) 90 | 10 | 20 | A/B |
| Example 3-2 | 75 | 25 | 42 | A/B |
| Example 3-3 | 60 | 40 | more than 80 | A/B |
| Example 3-4 | (II) 90 | 10 | 16 | A/B |
| Example 3-5 | 75 | 25 | 30 | A/B |
| Example 3-6 | 60 | 40 | 45 | A/B |
| Comp. Ex. 3-1 | (III) 100 | 0 | 6 | — |
| Comp. Ex. 3-2 | 90 | 10 | 8 | A/B |
| Comp. Ex. 3-3 | 75 | 25 | 6 | A/B |
| Comp. Ex. 3-4 | 60 | 40 | No film formed | AxB |
| Comp. Ex. 3-5 | (IV) 75 | 25 | 4 | A/B |

EXAMPLE 4

A low density polyethylene and maleic anhydride were melt-mixed in the presence of a free-radical initiator to obtain a maleic anhydride-grafted low density polyethylene having an MI of 1.0, a density of 0.920 g/cm$^3$ and a maleic anhydride content of 0.1%. The maleic anhydride-grafted low density polyethylene was melt-mixed with a polyurethane elastomer similar to that used in Example 1, in the proportions shown in Table IV, below. The pellets of the mixture were processed through a single layer inflation film fabricator to obtain films having a thickness of about 20 microns, which films are abbreviated as "films B". Both the cylinder temperature and the die temperature were 180° C.

By a conventional inflation method, a polyethylene film having a thickness of about 40 microns was prepared from a low density polyethylene having an MI of 2.0 and a density of 0.919, which film is abbreviated as "film C". By a conventional T-die extrusion method, a vinylidene chloride/vinyl chloride copolymer film having a thickness of about 20 microns was prepared from a copolymer comprised of 80% of vinylidene chloride and 20% of vinyl chloride, which film is abbreviated as "film A".

The above-mentioned three type films A, B and C were superposed upon one another in the order of C/B/A/B/C, and then, hot-pressed at a temperature of 180° C. and a pressure of 20 kg/cm² by using a pressing machine to obtain laminated films. After being cooled, each laminated film was cut into a size of 10 mm×10 cm. The interlaminar peel strength of the laminated film specimen, so prepared, was tested at a peel angle of 180° and a chuck separation rate of 200 mm/min. The test results are shown in Table IV, below.

COMPARATIVE EXAMPLE 4

Following a procedure similar to that mentioned in Example 4, laminated films were prepared wherein an unmodified low density polyethylene having an MI of 1.0 and a density of 0.920 was used in place of the maleic anhydride-grafted low density polyethylene for the preparation of film B. All other conditions remained substantially the same. The interlaminar peel strengths of the laminated films were tested by a procedure similar to that employed in Example 4. The test results are shown in the following Table IV.

TABLE IV

| Run No. | Composition (parts) | | Interlaminar peel strength (g/10 mm) |
|---|---|---|---|
| | Polyethylene | Elastomer | |
| Comp. Ex. 4-1 | Modified 100 | 0 | 30*x |
| Example 4-1 | Modified 80 | 20 | 900*b |
| Example 4-2 | Modified 60 | 40 | *a |
| Example 4-3 | Modified 50 | 50 | *a |
| Example 4-4 | Modified 40 | 60 | *a |
| Comp. Ex. 4-2 | unmodified 100 | 0 | *d, *x |
| Comp. Ex. 4-3 | unmodified 80 | 20 | 40*x |
| Comp. Ex. 4-4 | unmodified 60 | 40 | 120*c |
| Comp. Ex. 4-5 | unmodified 40 | 60 | 100*c |
| Comp. Ex. 4-6 | unmodified 0 | 100 | *d, *y |

*aThe specimen could not be peeled due to the rupture of the specimen.
*bInterlaminar peel strength could be measured, but the specimen was distorted due to the high interlaminar peel strength.
*cInterlaminar peel strength could be measured, but the specimen was delaminated due to the rupture of the adhesive modified olefin polymer/polyurethane lamina.
*dInterlaminar peel strength was zero.
*xSeparated at the interface between laminae A and B.
*ySeparated at the interface between laminae C and B.

EXAMPLE 5

Following a procedure similar to that mentioned in Example 4, laminated films were prepared wherein a mixture of 60 parts of the maleic anhydride-grafted low density polyethylene and 40 parts of each of the thermoplastic polyurethane elastomers shown in Table V, below, was used for the preparation of film B. All other conditions remained substantially the same. The interlaminar peel strengths of the laminated films were tested by a procedure similar to that employed in Example 4. The test results are shown in Table V, below.

In order to evaluate the thermal resistance of the laminated films and the oil resistance thereof, the laminated films were immersed in pork fat at a temperature of 100° C. for 30 minutes. The laminated films did not change in appearance.

COMPARATIVE EXAMPLE 5

Following a procedure similar to that mentioned in Example 5, laminated films were prepared, and their interlaminar peel strengths and thermal and oil resistances were tested. However, a mixture of 60 parts of the maleic anhydride-grafted low density polyethylene and 40 parts of each of the thermoplastic elastomers shown in Table V, below, was used for the preparation of films B in Run Nos. 5-1 and 5-2. An ethylene/vinyl acetate copolymer film having a thickness of 20 microns prepared from a copolymer having an MI of 3 and comprised of 74% of ethylene and 26% of vinyl acetate was used as film B in Run No. 5-3. All other conditions remained substantially the same.

TABLE V

| Run No. | Elastomer (Trade name)*1 | Interlaminar peel strength (g/10 mm) | Oil resistance (Change in appearance) |
|---|---|---|---|
| Example 5-1 | DESMOPAN 485 | *a | No change occurred |
| Example 5-2 | ROYLAR E85 | *a | No change occurred |
| Example 5-3 | PELLETHENE 2102-80A | *a | No change occurred |
| Example 5-4 | ELASTOLLAN E990FNA | *a | No change occurred |
| Comp. Ex. 5-1 | TUFPRENE A | 200*x | Laminae separated |
| Comp. Ex. 5-2 | TAFMER PO680 | 40*x | Laminae separated |
| Comp. Ex. 5-3 | — | 500*x | Laminae separated |

*1Thermoplastic elastomers:
DESMOPAN 485, polyurethane supplied by Sumitomo-Bayer Urethane Co.,
ROYLAR E85, polyurethane supplied by Uniroyal Co.,
PELLETHENE 2102-80A, polyurethane supplied by Kasei Upjohn Co.,
ELASTOLLAN E990FNA, polyurethane supplied by Nippon Elastollan Ind. Ltd.,
TUFPRENE A, styrene-butadiene copolymer thermoplastic elastomer supplied by Asahi Kasei Kogyo K.K., and
TAFMER PO680, polyolefin elastomer supplied by Mitsui Petrochemical Industries Co.
*aThe specimen could not be peeled due to the rupture of the specimen.
*xSeparated at the interface between laminae A and B.

EXAMPLE 6

Following a procedure similar to that mentioned in Example 4, thermoplastic resin mixtures were prepared wherein 40 parts of a thermoplastic polyurethane elastomer similar to that used in Example 4 were mixed with 60 parts of each of the olefin polymers shown in Table VI, below. All other conditions remained substantially the same. The thermoplastic resin mixtures were formed by an inflation method into films having a thickness of about 20 microns, which films are abbreviated as "film B".

Furthermore, a vinylidene chloride/vinyl chloride copolymer film (which is abbreviated as "film A") and various olefin polymer films (which are abbreviated as "films C") were prepared in a manner similar to that mentioned in Example 4. The olefin polymers used for the preparation of films C are shown in Table VI, below.

Using films A, B and C mentioned above, laminated films were prepared and their interlaminar peel strengths were evaluated by a procedure similar to that employed in Example 4. The results are shown in the following Table VI.

TABLE VI

| Run No. | Olefin polymers used for composite of film B | Olefin polymers used for film C | Interlaminar peel strength (g/10 mm) |
|---|---|---|---|
| Example 6-1 | Modified HDPE*1 | HDPE*7 | *a |
| Example 6-2 | Modified PP*2 | PP*8 | *a |
| Example 6-3 | Modified EVA*3 | EVA*9 | *a |
| Example 6-4 | Modified PP*4 | PP*8 | *a |
| Example 6-5 | Ionomer resin*5 | Ionomer resin*5 | *a |

TABLE VI-continued

| Run No. | Olefin polymers used for composite of film B | Olefin polymers used for film C | Interlaminar peel strength (g/10 mm) |
|---|---|---|---|
| Example 6-6 | Saponified EVA*6 | EVA*9 | *a |

*[1] Maleic anhydride-grafted high density polyethylene having an MI of 1, a density of 0.945 g/cm$^3$ and a maleic anhydride content of 0.1%.
*[2] Maleic anhydride-grafted polypropylene having an MFI of 8, a density of 0.91 g/cm$^3$ and a maleic anyhdride content of 0.1%.
*[3] Maleic anhydride-grafted ethylene/vinylacetate copolymer having an MI of 3, a vinyl acetate content of 10% and a maleic anhydride content of 0.2%.
*[4] Acrylic acid-grafted polypropylene having an MFI of 10, a density of 0.91 g/cm$^3$ and an acrylic acid content of 5%.
*[5] Ionomer resin "Surlyn 1650" (trade name, supplied by Mitsui Polychemical Co.).
*[6] Saponified ethylene/vinyl acetate copolymer having an MI of 15, a vinyl acetate content of 30% and a saponification degree of 60%.
*[7] High density polyethylene having an MI of 1 and a density of 0.953 g/cm$^3$.
*[8] Crystalline polypropylene having an MFI of 1.3 and a density of 0.91 g/cm$^3$.
*[9] Ethylene/vinyl acetate copolymer having an MI of 2 and a vinyl acetate content of 8%.
*[a] The specimen could not be peeled due to the rupture of the specimen.

COMPARATIVE EXAMPLE 6

Following a procedure similar to that mentioned in Example 6, laminated films were prepared wherein each of the olefin polymers listed in Table VI, above, was used in place of the mixture of the polyurethane elastomer and each of the olefin polymers for the preparation of film B. All other conditions remained substantially the same. The interlaminar peel strengths of the laminated films are shown in the following Table VII.

TABLE VII

| Run No. | Olefin polymers used for film B | Olefin polymers used for film C | Interlaminar peel strength (g/10 mm) |
|---|---|---|---|
| Comp. Ex. 6-1 | Unmodified HDPE*1 | HDPE*7 | 90*x |
| Comp. Ex. 6-2 | Unmodified PP*2 | PP*8 | 100*x |
| Comp. Ex. 6-3 | Unmodified EVA*3 | EVA*9 | 300*x |
| Comp. Ex. 6-4 | Unmodified PP*4 | PP*8 | 70*x |
| Comp. Ex. 6-5 | Ionomer resin*5 | Ionomer resin*5 | 50*x |
| Comp. Ex. 6-6 | Saponified EVA*6 | EVA*9 | 400*x |

*[1] through *[9] are the same as mentioned in the footnote of Table VI.
*[x] Separated at the interface between laminae A and B.

EXAMPLE 7

Following a procedure similar to that mentioned in Example 4, a thermoplastic resin mixture was prepared from 40 parts of a thermoplastic polyurethane elastomer similar to that used in Example 4 and 60 parts of a maleic anhydride-grafted high density polyethylene having an MI of 0.3, a density of 0.953 g/cm$^3$ and a maleic anhydride content of 0.2%, with all other conditions remaining substantially the same.

The above-mentioned elastomer-containing resin mixture and a polyvinyl chloride resin composition comprised of 100 parts of polyvinyl chloride (trade name "Geon 103 EP-8", supplied by Nippon Geon K.K.), 10 parts of "Hi-Blen 203" (trader name, an MBS resin supplied by Nippon Geon K.K.), 2 parts of a Ca-Zn composite stabilizer and one part of butyl stearate were separately melted by using two extruders. The molten elastomer-containing resin mixture and the molten polyvinyl chloride resin composition were extruded through a double circular die maintained at a temperature of 180° C. and having concentrically arranged inner and outer circular passages. The elastomer-containing resin mixture and the polyvinyl chloride resin composition were passed through the outer and inner passages, respectively, to obtain threby a double wall parison. A 500 ml volume bottle, 75 mm in outer diameter and 160 mm in height, was blow-molded from the double wall parison. The outer elastomer-containing resin mixture lamina and the inner polyvinyl chloride resin composition lamina were 0.5 mm and 0.1 mm in thickness, respectively. The properties of the bottle are shown in Table VIII, below.

COMPARATIVE EXAMPLE 7

Following a procedure similar to that mentioned in Example 7, a double wall bottle was manufactured wherein a maleic anhydride-grafted high density polyethylene, similar to that used in Example 7, was used instead of the polyurethane elastomer-containing resin mixture. All other conditions remained substantially the same. The properties of the bottle are shown in the following Table VIII.

TABLE VIII

| Properties | Example 7 | Comp. Ex. 7 |
|---|---|---|
| Interlaminar peel strength at the cylindrical portion (kg/25 mm) | More than 5 | 0.2 |
| Adhesion strength at the welded bottom portion | Good | Poor |
| Permeability*1 to | | |
| Gasoline (%) | 0.1 | 0.5 |
| Benzene (%) | 0.1 | 0.5 |

*[1] The amount in % of gasoline or benzene permeated the bottle wall as measured after the gasoline or benzene-filled bottle was left to stand at room temperature for one month.

EXAMPLE 8

A high density polyethylene and maleic anhydride were melt-mixed in the presence of a free-radical initiator to obtain a maleic anhydride-grafted high density polyethylene having an MI of 8.0, a density of 0.953 g/cm$^3$ and a maleic anhydride content of 0.1%. The maleic anhydride-grafted high density polyethylene was melt-mixed with a thermoplastic polyurethane elastomer similar to that employed in Example 1, in the proportions shown in Table IX, below.

The above-mentioned pellets were melted in a cylinder maintained at a temperature of 210° C. A high density polyethylene having an MI of 8 and a density of 0.945 g/cm$^3$ was melted in a cylinder maintained at a temperature of 230° C. Each of the molten polyurethane elastomer/modified high density polyethylene mixture and the molten high density polyethylene were coextruded through a multi-manifold co-extrusion T-die maintained at a temperature of about 220° C. to form a multi-layer film comprised of a polyurethane elastomer/modified high density polyethylene mixture layer 15 microns in thickness, which layer is abbreviated as "layer B", and a high density polyethylene layer 45 microns in thickness, which layer is abbreviated as "layer C". While the multi-layer film was still not completely solidified, the multi-layer film was laminated under pressure with an unanchor-coated, biaxially drawn polyethylene terephthalate film having a thickness of 50 microns (trade name, "Lumilar" supplied by Toray Industries Ltd.), by a conventional procedure. The polyethylene terephthalate film layer in the resultant laminated film is abbreviated as "layer A".

The laminated film, so prepared, was cut into a size 25 mm in width and 15 cm in length. The obtained laminated film specimen was tested for its interlaminar peel strength by a procedure similar to that mentioned in Example 4. The test results are shown in Table IX, below.

COMPARATIVE EXAMPLE 8

Following a procedure similar to that mentioned in Example 8, laminated films comprised of layers A, B and C were prepared wherein an unmodified high density polyethylene having an MI of 1.0 and a density of 0.953 g/cm³ was used in place of the maleic anhydride-grafted high density polyethylene for the preparation of the layer B. All other conditions remained substantially the same. The interlaminar peel strengths of the laminated films are shown in the following Table IX.

TABLE IX

| Run. No. | Composition (parts) Polyethylene | Elastomer | Interlaminar peel strength (kg/25 mm) |
|---|---|---|---|
| Comp. Ex. 8-1 | Modified 100 | 0 | Less than 1*x |
| Example 8-1 | Modified 80 | 20 | 3*x |
| Example 8-2 | Modified 60 | 40 | 7*b |
| Example 8-3 | Modified 50 | 50 | 7*b |
| Example 8-4 | Modified 40 | 60 | 5*b |
| Comp. Ex. 8-2 | Unmodified 100 | 0 | Less than 1*d |
| Comp. Ex. 8-3 | Unmodified 80 | 20 | Less than 1*x |
| Comp. Ex. 8-4 | Unmodified 60 | 40 | 1*c |
| Comp. Ex. 8-5 | Unmodified 40 | 60 | 1*c |
| Comp. Ex. 8-6 | Unmodified 0 | 100 | Less than 1*y |

*a through *d, and *x and *y are the same as defined in the footnote of Table IV.

EXAMPLE 9

Pellets of a maleic anhydride-grafted low density polyethylene/polyurethane elastomer mixture, similar to those obtained in Example 4, were melted at a temperature of 210° C. by using an extruder. An ethylene-vinyl alcohol copolymer comprised of 31 mole % of ethylene and having a saponification degree of 99% was melted at a temperature of 220° C. by using another extruder. These two molten materials were co-extruded through a double circular inflation die to obtain a composite inflation film comprised of an inner maleic anhydride-grafted low density polyethylene/polyurethane elastomer mixture layer having a thickness of 70 microns and an outer ethylene-vinyl alcohol copolymer layer having a thickness of 30 microns.

The composite film was cut into a size 10 mm in width and 10 cm in length. The interlaminar peel strength of the film specimen, so prepared, was tested by a procedure similar to that mentioned in Example 4. The interlaminar peel strength of the film specimen was also similarly tested after the film specimen was immersed in hot water at a temperature of 80° C. for one hour. The test results are shown in Table X, below.

COMPARATIVE EXAMPLE 9

Following a procedure similar to that mentioned in Example 9, composite inflation films were prepared and their interlaminar peel strengths were tested. However, in this example, an unmodified low density polyethylene having an MI of 1.0 and a density of 0.920 g/cm³ was used in place of the maleic anhydride-grafted low density polyethylene. All other conditions remained substantially the same. The interlaminar peel strengths of the films are shown in the following Table X.

TABLE X

| Run. No. | Composition (parts) Polyethylene | Elastomer | Interlaminar peel strength After left to stand at room temperature | After hot water immersion at 80° C. |
|---|---|---|---|---|
| Comp. Ex. 9-1 | Modified 100 | 0 | 250 | 200 |
| Example 9-1 | Modified 80 | 20 | More than 1200*b | More than 1200*b |
| Example 9-2 | Modified 60 | 40 | More than 1200*a | More than 1200*a |
| Example 9-3 | Modified 50 | 50 | More than 1200*a | More than 1200*a |
| Example 9-4 | Modified 40 | 60 | More than 1200*a | More than 1200*a |
| Comp. Ex. 9-2 | Unmodified 100 | 0 | More than 1200*d | — |
| Comp. Ex. 9-3 | Unmodified 80 | 20 | 50 | 30 |
| Comp. Ex. 9-4 | Unmodified 60 | 40 | 120 | 90 |
| Comp. Ex. 9-5 | Unmodified 40 | 60 | 280 | 220 |

*a, *b and *d are the same as mentioned in the footnote of Table IV.

EXAMPLE 10

Pellets of a maleic anhydride-grafted low density polyethylene/polyurethane elastomer mixture, similar to those obtained in Example 4, were melted by using an extruder. A nylon 6 (trade name "Amilan CM 1021" supplied by Toray Industries Ltd.) was melted by using another extruder. A low density polyethylene having an MI of 2.0 and a density of 0.919 g/cm³ was melted by using still another extruder. These three molten materials were co-extruded through a triple circular inflation die to obtain a composite inflation film comprised of an inner low density polyethylene layer having a thickness of 50 microns, a medial maleic anhydride-grafted low density polyethylene/polyurethane elastomer mixture layer having a thickness of 25 microns and an outer nylon 6 layer having a thickness of 25 microns.

The composite film was cut into a size 10 mm in width and 10 cm in length. The interlaminar peel strengths of the film specimens, so prepared, were tested after the specimens were left to stand at room temperature and after the specimens were immersed in hot water at a temperature of 80° C. for one hour, respectively, in a manner similar to that mentioned in Example 9. The test results are shown in Table XI, below.

COMPARATIVE EXAMPLE 10

Following a procedure similar to that mentioned in Example 10, composite inflation films were prepared and their interlaminar peel strengths were tested. However, in this example, an unmodified low density polyethylene having an MI of 1.0 and a density of 0.920 g/m³ was used in place of the maleic anhydride-grafted low density polyethylene. All other conditions remained substantially the same. The interlaminer peel strengths of the films are shown in the following Table XI.

TABLE XI

| Run No. | Composition (parts) Polyethylene | Elastomer | Interlaminar peel strength After left to stand at room temperature | After hot water immersion at 80° C. |
|---|---|---|---|---|
| Comp. Ex. 10-1 | Modified 100 | 0 | 600 | 500 |
| Example 10-1 | Modified 80 | 20 | *a | *a |
| Example 10-2 | Modified 60 | 40 | *a | *a |
| Example 10-3 | Modified 50 | 50 | *a | *a |
| Example 10-4 | Modified 40 | 60 | *a | *a |
| Comp. Ex. 10-2 | Unmodified 100 | 0 | *d | — |
| Comp. Ex. 10-3 | Unmodified 80 | 20 | *x' | *x' |
| Comp. Ex. 10-4 | Unmodified 60 | 40 | 250 | 150 |
| Comp. Ex. 10-5 | Unmodified 40 | 60 | 300 | 200 |

*a and *d are the same as mentioned in the footnote of Table IV, and *x' means that the film was separated between the laminae.

EXAMPLE 11

Following a procedure similar to that mentioned in Example 10, three layer composite inflation films were prepared and their interlaminar peel strengths were tested. However, in this example, a mixture comprised of 40 parts of a thermoplastic polyurethane elastomer and 60 parts of each of the olefin polymers shown in Table XII, below, was used in place of the maleic anhydride-grafted low density polyethylene/polyurethane elastomer mixture for the preparation of the medial layer of the composite inflation film. All other conditions remained substantially the same. The interlaminar peel strengths of the films are shown in the following Table XII.

TABLE XII

| Run. No. | Olefin polymers used for composite of film B | Interlaminar peel strength (g/10 mm) |
|---|---|---|
| Ex. 11-1 | Modified HDPE*1 | *a |
| Ex. 11-2 | Modified PP*2 | *a |
| Ex. 11-3 | Modified EVA*3 | *a |
| Ex. 11-4 | Modified LDPE*4 | *a |
| Ex. 11-5 | Ionomer resin*5 | *a |
| Ex. 11-6 | Saponified EVA*6 | *a |

*1 Maleic anhydride-grafted high density polyethylene having an MI of 1, a density of 0.945 g/cm³ and a maleic anhydride content of 0.1%.
*2 Maleic anhydride-grafted polypropylene having an MFI of 1.5, a density of 0.91 g/cm³ and a maleic anhydride content of 0.1%.
*3 Maleic anhydride-grafted ethylene/vinyl acetate copolymer having an MI of 3, a vinyl acetate content of 10% and a maleic anhydride content of 0.2%.
*4 Acrylic acid-grafted low density polyethylene having an MI of 3.7, a density of 0.923 g/cm³ and an acrylic acid content of 1.2%.
*5 Ionomer resin "Surlyn 1650" (trade name, supplied by Mitsui Polychemical Co.).
*6 Saponified ethylene/vinyl acetate copolymer having an MI of 5, a vinyl acetate content of 15% and a saponification degree of 60%.
*a The specimen could not be peeled due to the rupture of the specimen.

COMPARATIVE EXAMPLE 11

Following a procedure similar to that mentioned in Example 11, composite inflation films were prepared wherein each of the olefin polymers listed in Table XII, above, was used in place of the mixture of the polyurethane elastomer and each of the olefin polymers. All other conditions remained substantially the same. The interlaminar peel strengths of the films are shown in the following Table XIII.

TABLE XIII

| Run. No. | Olefin polymers used for film B | Interlaminar peel strength (g/10 mm) |
|---|---|---|
| Comp. Ex. 11-1 | Unmodified HDPE*1 | 420 |
| Comp. Ex. 11-2 | Unmodified PP*2 | 300 |
| Comp. Ex. 11-3 | Unmodified EVA*3 | 650 |
| Comp. Ex. 11-4 | Unmodified LDPE*4 | 120 |
| Comp. Ex. 11-5 | Ionomer resin*5 | 500 |
| Comp. Ex. 11-6 | Saponified EVA*6 | 150 |

*1 through *6 are the same as mentioned in the footnote of Table XII.

EXAMPLE 12

A mixture of a maleic anhydride-grafted ethylene/vinyl acetate copolymer and a thermoplastic polyurethane elastomer, which mixture was similar to that used in Example 11-3, was melt-extruded at a temperature of 180° C. through a single layer inflation die to obtain a film having a thickness of about 30 microns, which film is abbreviated as "film B". The film B was laminated with an undrawn nylon 66 film having a thickness of 30 microns (trade name "LEONA" supplied by Asahi Kasei Kogyo K.K.), which film is abbreviated as "film A", and a vinylidene chloride/vinyl chloride copolymer film having a thickness of about 20 microns, which film was prepared by a T-die extrusion procedure from a copolymer comprised of 80% of vinylidene chloride and 20% of vinyl chloride, and which film is abbreviated as "film D". That is, the unanchor-coated films A, B and D were superposed upon each other in the order of A/B/D, and then, hot-pressed at a temperature of 180° C. and a pressure of 20 kg/cm² by using a pressing machine to obtain a laminated film. After being cooled, the interlaminar peel strength of the laminated film was evaluated. The interlaminar peel strength of the laminated film was too large to be separated between the laminae without the rupture thereof.

EXAMPLE 13

Following a procedure similar to that mentioned in Example 12, a three layer laminated film was prepared wherein an unanchor-coated, biaxially drawn polyethylene terephthalate film having a thickness of 50 microns (trade name "Lumilar" supplied by Toray Industries Ltd.) was used in place of the film D. The hot-pressing temperature was changed to 200° C. All other conditions remained substantially the same. The interlaminar peel strength of the laminated film was too large (i.e., more than 1,000 kg/10 mm) to be separated between the laminae without the rupture thereof.

EXAMPLE 14

Following a procedure similar to that mentioned in Example 12, a three layer laminated film was prepared. The three films used for the preparation of the laminated film were (a) an inflation film having a thickness of about 40 microns prepared from a maleic anhydride-grafted low density polyethylene/polyurethane elastomer mixture similar to that used in Example 10-2, which film is abbreviated as "A"; (b) an inflation film having a thickness of about 40 microns prepared from a low density polyethylene film having an MI of 2.0 and a density of 0.919, which film is abbreviated as "C"; and (c) a T-die film having a thickness of about 80 microns prepared from a high-nitrile resin (trade name, "BAREX 210" supplied by SOHIO), which film is abbreviated as "G". These three films were superposed upon each other in the order of C/A/G, and then, hot-pressed at a temperature of 200° C. and a pressure of 20 kg/cm$^2$. All other conditions remained substantially the same. The interlaminar peel strength of the obtained laminated film was too large to be separated between the laminae without the rupture thereof.

EXAMPLE 15

Following a procedure similar to that mentioned in Example 12, a three layer laminate was prepared. The three laminae used for the preparation of the laminate were (a) an undrawn inflation film having a thickness of about 40 microns prepared from a maleic anhydride-grafted low density polyethylene/polyurethane elastomer mixture similar to that used in Example 10-2, which film is abbreviated as "A"; (b) an undrawn inflation nylon 6 film having a thickness of about 40 microns, which film is abbreviated as "F"; and (c) a pressed sheet having a thickness of about 100 microns prepared from an ABS resin (trade name "Styrac 200" supplied by Asahi-Dow K.K.), which sheet is abbreviated as "H". These films and sheet were superposed upon each other in the order of F/A/H, and then, hot-pressed at a temperature of 230° C. and a pressure of 20 kg/cm$^2$. All other conditions remained substantially the same. The interlaminar peel strength of the obtained laminate was too large to be separated between the laminae without the rupture thereof.

EXAMPLE 16

Following a procedure similar to that mentioned in Example 12, a three layer laminate was prepared. The three laminae used for the preparation of the laminate were (a) an inflation film having a thickness of about 40 microns prepared from a maleic anhydride-grafted ethylene-vinyl acetal copolymer/polyurethane elastomer mixture similar to that used in Example 11-3, which film is abbreviated as "A"; (b) a biaxially drawn polyethylene terephthalate film having a thickness of about 50 microns, similar to that used in Example 8, which film is abbreviated as "D"; and (c) an extruded polymethyl methacrylate sheet having a thickness of 2 mm (trade name "DELAGLASS" supplied by Asahi Kasei Kogyo K.K.), which sheet is abbreviated as "I". These films and sheet are superposed upon each other in the order of D/A/I, and then, hot-pressed at a temperature of 200° C. and a pressure of 20 kg/cm$^2$. All other conditions remained substantially the same. The interlaminar peel strength of the obtained laminate was too large to be separated between the laminae without the rupture thereof.

EXAMPLE 17

Following a procedure similar to that mentioned in Example 12, a three layer laminate was prepared. The three laminae used for the preparation of the laminate were (a) an inflation film having a thickness of about 40 microns prepared from a maleic anhydride-grafted low density polyethylene/polyurethane elastomer mixture similar to that used in Example 10-2, which film is abbreviated as "A"; (b) a polyether type polyurethane foam sheet having a thickness of about 10 mm and a density of 32 kg/m$^3$, which sheet is abbreviated as "J"; and (c) a paperboard having a thickness of about 1 mm, which is abbreviated as "L". These laminae were superposed upon each other in the order of L/A/J, and then, hot-pressed at a temperature of 200° C. and a pressure of 5 kg/cm$^2$. All other conditions remained substantially the same. The interlaminar peel strength of the obtained laminate was too large to be separated between the laminae without the rupture thereof.

EXAMPLE 18

Following a procedure similar to that mentioned in Example 12, a three layer laminate was prepared. The three laminae used for the preparation of the laminate were (a) an inflation film having a thickness of about 40 microns prepared from a maleic anhydride-grafted ethylene vinyl acetate copolymer/polyurethane elastomer mixture similar to that used in Example 11-3, which film is abbreviated as "A"; (b) a waterproof SBR resin sheet having a thickness of about one mm, which sheet is abbreviated as "K"; and (c) a cementitious mortar plate having a thickness of about 10 mm, which plate is abbreviated as "M". These laminae were superposed upon each other in the order of K/A/M, and then, hot-pressed at a temperature of 200° C. and a pressure of 10 kg/cm$^2$. All other conditions remained substantially the same. The interlaminar peel strength of the obtained laminate was to large to be separated between the laminae without the rupture thereof.

EXAMPLE 19

A sodium density polyethylene and maleic anhydride were melt-mixed in the presence of a free-radical initiator to obtain a maleic anhydride-grafted medium density polyethylene having a MI of 1.5, a density of 0.932 g/cm$^3$ and a maleic anhydride content of 0.2%. 60 parts of the maleic anhydride-grafted medium density polyethylene were mixed with 40 parts of a thermoplastic polyurethane elastomer similar to that used in Example 1, at a temperature of 190° C. by using a Banbury mixer to obtain pellets.

The above-mentioned pellets were extrusion-coated at a temperature of 210° C. onto a steel pipe pre-heated at a temperature of 130° C. and having an outer diameter of 609.6 mm to form a coating having a thickness of about 2 mm. The coating exhibited too large an adhesion to be peeled from the pipe.

EXAMPLE 20

Following a procedure similar to that mentioned in Example 1, pellets of thermoplastic resin mixtures were prepared wherein 60 parts of each of the olefin polymers shown in Table XIV, below, in place of the maleic anhydride-grafted high density polyethylene were mixed with 40 parts of a thermoplastic polyurethane elastomer similar to that used in Example 1. The pellets were melt-extruded into films having a thickness of about 100 microns. Each film was sandwiched between the same film- or sheet-like materials, which are listed below, and then, hot-pressed at a temperature of 200° C. and a pressure of 20 kg/cm² to form a laminate. The interlaminar peel strength of the laminate was tested. The test results are shown in Table XIV, below.

The film- or sheet-like materials used for sandwiching similar to that used in Example 20 were separately and singly formed into films having a thickness of about 100 microns. Each film was sandwiched between the film- or sheet-like materials similar to those used in Example 20 to obtain laminates, in a manner similar to that mentioned in Example 20. The interlaminar peel strengths of the laminates are shown in the following Table XIV.

TABLE XIV

| Run No. | Olefin polymer | Interlaminar peel strength (kg/25 mm) | | | | | | | |
|---|---|---|---|---|---|---|---|---|---|
| | | HDPE | LDPE | PP | PET | PA | Al | Fe | Paper |
| Example 20-1 | Unmodified HDPE*1 | More than 10, B | — | — | More than 10, B | 5, B | More than 10, B | B | A |
| Example 20-2 | Unmodified LDPE*2 | — | More than 10, B | — | 3, B | 2, B | More than 10, B | B | A |
| Example 20-3 | Unmodified PP*3 | — | — | More than 10, B | 4, B | 3, B | More than 10, B | B | A |
| Example 20-4 | Unmodified EVA*4 | — | More than 10, B | — | More than 10, B | 7, B | More than 10, B | B | A |
| Example 20-5 | Saponified, EVA*5 Unmodified | — | — | — | More than 10, B | More than 10, B | More than 10, B | B | A |
| Example 20-6 | Unmodified PP*6 | — | — | More than 10, B | 4, B | 4, B | More than 10, B | B | A |
| Example 20-7 | E-MA copolymer*7 | — | More than 10, B | — | More than 10, B | 4, B | More than 10, B | B | A |
| Example 20-8 | Ionomer resin*8 | — | More than 10, B | — | More than 10, B | 4, B | More than 10, B | B | A |
| Comp. Ex. 20-1 | Modified HDPE*1 | More than 10, B | — | — | Less than 1, C | Less than 1, C | 3 | B | A |
| Comp. Ex. 20-2 | Modified LDPE*2 | — | More than 10, B | — | Less than 1, C | Less than 1, C | 2 | B | A |
| Comp. Ex. 20-3 | Modified PP*3 | — | — | More than 10, B | less than 1, C | less than 1, C | 2 | B | A |
| Comp. Ex. 20-4 | Modified EVA*4 | — | More than 10, B | — | 3, C | 3, C | 4 | B | A |
| Comp. Ex. 20-5 | Saponified, EVA*5 modified | — | — | — | 6, B | 4, C | 5 | B | A |
| Comp. Ex. 20-6 | Modified PP*6 | — | — | More than 10, B | Less than 1, C | Less than 1, C | 2 | C | A |
| Comp. Ex. 20-7 | E-MA copolymer*7 | — | More than 10, B | — | Less than 1, C | 2, C | 2 | B | A |
| Comp. Ex. 20-8 | Ionomer resin*8 | — | More than 10, B | — | Less than 1, C | 2, C | 3 | B | A |
| Comp. Ex. 20-9 | Polyurethane*9 | Less than 1, C | Less than 1, C | Less than 1, C | 6, B | 7, B | 5 | C | A |

*1Maleic anhydride-grafted high density polyethylene having an MI of 1.0, a density of 0.945 g/cm³ and a maleic anhydride content of 0.1%.
*2Maleic anhydride-grafted low density polyethylene having an MI of 1.3, a density of 0.920 g/cm³ and a maleic anhydride content of 0.2%.
*3Maleic anhydride-grafted polypropylene having an MFI of 8, a density of 0.91 g/cm³ and a maleic anhydride content of 0.1%.
*4Maleic anhydride-grafted ethylene/vinyl acetate copolymer having an MI of 3, a vinyl acetate content of 10% and maleic anhydride content of 0.2%.
*5Saponified, maleic anhydride-grafted ethylene/vinyl acetate copolymer having an MI of 15, a vinyl acetate content of 30%, a maleic anhydride content of 0.2% and a saponification degree of 60%.
*6Acrylic acid-grafted polypropylene having MFI of 20, a density of 0.91 g/cm³ and an acrylic acid content of 5%.
*7Ethylene/methacrylic acid copolymer having an MI of 5, a density of 0.94 g/cm³ and a methacrylic acid content of 10%.
*8Ionomer resin (trade name "Surlyn 1650" supplied by Mitsui Polychemical Co.).
*9Thermoplastic polyurethane elastomer similiar to that used in Example 1.
A: Sandwiching film- or sheet-like materials were broken.
B: Sandwiched interlayer material was broken.
C: Separated between the laminae.

the olefin polymer/polyurethane elastomer mixture film were as follows.
HDPE: High density polyethylene film about 100 microns in thickness.
LDPE: Low density polyethylene film about 100 microns in thickness.
PP: Crystalline polypropylene film about 100 microns in thickness.
PET: Biaxially drawn polyethylene terephthalate film about 19 microns in thickness.
PA: Undrawn nylon 66 film about 100 microns in thickness.
Al: Rigid aluminum sheet about 100 microns in thickness.
Fe: Polished mild steel sheet about 1 mm in thickness.
Paper: Corrugated paperboard.

COMPARATIVE EXAMPLE 20

Each of olefin polymers similar to those used in Example 20 and a thermoplastic polyurethane elastomer

What is claimed is:
1. A laminate having at least two laminae bonded to each other;
   at least one of the laminae being comprised of a thermoplastic resinous composition consisting essentially of, based on the weight of the resinous composition,
   (a) 5 to 70% by weight of a thermoplastic polyurethane elastomer, and
   (b) 30 to 95% by weight of a modified polyolefin which is an olefin polymer having grafted thereon 0.005% through 5% by mole of maleic acid or maleic anhydride per mole of the recurring unit in the olefin polymer, and
   the other of the laminae being comprised of at least one material selected from the group consisting of vinyl chloride polymer resins, vinylidene chloride polymer resins, thermoplastic polyester resins, ethylene/vinyl alcohol copolymer resins, polyamide resins, polyacrylonitrile and nitrile copolymer resins comprising at least 50% by weight of units derived from an unsaturated nitrile, polystyrene and styrene copolymer resins, polymethyl methacrylate and acrylic or methacrylic acid ester copolymer resins, polyurethane resins, olefin polymer resins, polyacetal resins, polyvinyl acetal resins, polycarbonate resins, polyphenylene oxide resins, polysulfone resins, epoxy resins, phenol-formaldehyde resins, unsaturated polyester resins, melamine-formaldehyde resins, urea-formaldehyde resins, natural and synthetic rubbers, cellulosic materials, cement, glass and other ceramic materials and metals.

2. A laminate according to claim 1 which comprises a lamina (a) of said resinous composition, a lamina of a vinyl chloride polymer or vinylidene chloride polymer resin (b) and an optional lamina of an olefin polymer resin (c), and which has a laminar structure selected from the group consisting of (a)/(b), (a)/(b)/(a), (c)/(a)/(b), (c)/(a)/(b)/(a) and (c)/(a)/(b)/(a)/(c).

3. A laminate according to claim 1 which comprises a lamina (a) of said resinous composition, a lamina of a thermoplastic polyester resin (d) and an optional lamina of an olefin polymer resin (c), and which has a laminar structure selected from the group consisting of (a)/(d), (a)/(d)/(a), (c)/(a)/(d), (c)/(a)/(d)/(a) and (c)/(a)/(d)/(a)/(c).

4. A laminate according to claim 1 which comprises a lamina (a) of said resinous composition, a lamina of an ethylene/vinyl alcohol copolymer resin (e) and, an optional lamina of an olefin polymer resin (c), and which has a laminar structure selected from the group consisting of (a)/(e), (a)/(e)/(a), (c)/(a)/(e), (c)/(a)/(e)/(a) and (c)/(a)/(e)/(a)/(c).

5. A laminate according to claim 1 which comprises a lamina (a) of said resinous composition, a lamina of a polyamide resin (f) and an optional lamina of an olefin polymer resin (c), and which has a laminar structure selected from the group consisting of (a)/(f), (a)/(f)/(a), (c)/(a)/(f), and (c)/(a)/(f)/(a)/(c).

6. A laminate according to claim 1 which comprises a lamina (a) of said resinous composition, a lamina of a polyacrylonitrile or nitrile copolymer resin (g) and an optional lamina of an olefin polymer resin (c), and which has a laminar structure selected from the group consisting of (a)/(g), (a)/(g)/(a), (c)/(a)/(g) and (c)/(a)/(g)/(a)/(c).

7. A laminate according to claim 1 which comprises a lamina (a) of said resinous composition, at least two laminae selected from the group consisting of a lamina of a vinyl chloride polymer or vinylidene chloride polymer resin (b), a lamina of an olefin polymer resin (c), a lamina of a thermoplastic polyester resin (d), a lamina of an ethylene/vinyl alcohol copolymer resin (e), a lamina of a polyamide resin (f) and a lamina of a polyacrylonitrile or nitrile copolymer resin (g), and which as a laminar structure selected from the group consisting of (b)/(a)/(d), (b)/(a)/(e), (b)/(a)/(f), (b)/(a)/(g), (d)/(a)/(e), (d)/(a)/(f), (d)/(a)/(g), (e)/(a)/(f), (e)/(a)/(g), (f)/(a)/(g), (c)/(a)/(b)/(a)/(d), (c)/(a)/(b)/(a)/(e), (c)/(a)/(b)/(a)/(f), (c)/(a)/(b)/(a)/(g), (c)/(a)/(d)/(a)/(b), (c)/(a)/(d)/(a)/(e), (c)/(a)/(d)/(a)/(f), (c)/(a)/(d)/(a)/(g), (c)/(a)/(e)/(a)/(b), (c)/(a)/(e)/(a)/(d), (c)/(a)/(e)/(a)/(f), (c)/(a)/(e)/(a)/(g), (c)/(a)/(f)/(a)/(b), (c)/(a)/(f)/(a)/(d), (c)/(a)/(f)/(a)/(e), (c)/(a)/(f)/(a)/(g), (c)/(a)/(g)/(a)/(b), (c)/(a)/(g)/(a)/(d), (c)/(a)/(g)/(a)/(e) and (c)/(a)/(g)/(a)/(f).

8. A laminate according to claim 1 which comprises a lamina (a) of said resinous composition and at least one lamina selected from the group consisting of a lamina of an olefin polymer (c), a lamina of a polystyrene or styrene copolymer resin (h), a polymethyl methacrylate or acrylic or methacrylic acid ester copolymer resin (i) and a lamina (X) of a material selected from a vinyl chloride polymer or vinylidene chloride polymer resin (b), a thermoplastic polyester resin (d), an ethylene/vinyl alcohol copolymer resin (e), a polyamide resin (f) and a polyacrylonitrile or nitrile copolymer resin (g), and which has a laminar structure selected from the group consisting of (a)/(h), (a)/(i), (h)/(a)/(i), (X)/(a)/(h), (X)/(a)/(i), (c)/(a)/(X)/(a)/(h), (c)/(a)/(X)/(a)/(i) and (h)/(a)/(X)/(a)/(i).

9. A laminate according to claim 1 which comprises a lamina (a) of said resinous composition and at least one lamina selected from the group consisting of a lamina of a polyurethane resin (j), a lamina of a natural or synthetic rubber (k), a lamina of a cellulosic high molecular weight substance (l), a lamina of a ceramic material (m), a lamina of a metal (n) and a lamina (Y) of a material selected from a vinyl chloride polymer or vinylidene chloride polymer resin (b), an olefin polymer (c), a thermoplastic polyester resin (d), an ethylene/vinyl alcohol copolymer resin (e), a polyamide resin (f), a polyacrylonitrile or nitrile copolymer resin (g), a polystyrene or styrene copolymer resin (h) and a polymethyl methacrylate or acrylic or methacrylic acid ester copolymer resin (i), and which has a laminar structure selected from the group consisting of (a)/(j), (a)/(k), (a)/(l), (a)/(m), (a)/(n), (Y)/(a)/(j), (Y)/(a)/(k), (Y)/(a)/(l), (Y)/(a)/(m), (Y)/(a)/(n), (j)/(a)/(k), (j)/(a)/(l), (j)/(a)/(m), (j)/(a)/(n), (k)/(a)/(l), (k)/(a)/(m), (k)/(a)/(n), (l)/(a)/(m), (l)/(a)/(n), (m)/(a)/(n), (l)/(a)/(l), (m)/(a)/(m) and (n)/(a)/(n).

* * * * *